United States Patent Office 2,865,926
Patented Dec. 23, 1958

2,865,926

PROCESS OF MAKING 3-SUBSTITUTED-2-OXAZOLIDINONES

Robert C. Harrington, Jr., Kingsport, Tenn., assignor to Eastman Kodak Company, Rochester, N. Y., a corporation of New Jersey No Drawing. Application March 19, 1957
Serial No. 646,970

6 Claims. (Cl. 260—307)

This invention relates to a novel process of making 3-substituted-2-oxazolidinones.

I have discovered that 3-substituted-2-oxazolidinones, in which the 3-substituent is phenyl, lower alkyl, or lower-alkyl-substituted phenyl, can be prepared by heating the corresponding aryl, alkyl or alkaryl isocyanate with ethylene carbonate in the presence of a small amount of an alkaline or acid catalyst. For example, 3-phenyl-2-oxazolidinone can be prepared from phenyl isocyanate and ethylene carbonate, by a reaction represented by the following equation:

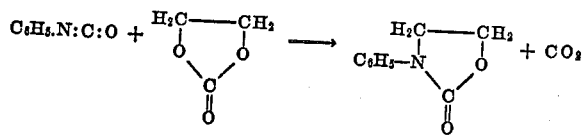

The catalysts which may be used include sodium carbonate, potassium carbonate, sodium hydroxide, potassium hydroxide, zinc chloride, and stannous chloride. I prefer to use sodium carbonate. Moisture should be excluded from the reaction mixture.

By way of illustrating the method of carrying out my invention, I give the following examples.

*Example 1.*—A mixture of 97 grams (1.1 moles) of ethylene carbonate, 119 grams (1 mole) of phenyl isocyanate, and 0.5 gram anhydrous sodium carbonate was placed in a 3-neck flask equipped with thermometer, stirrer, and reflux condenser. The mixture was heated, with stirring, until the temperature reached 235° C. After cooling, the resulting solid was recrystallized from a small amount of toluene, and again from ethanol to give white crystals having a melting point of 118° C. Analysis: N: Found, 8.50%; theoretical, 8.59%. A yield of 82% (based on phenyl isocyanate) of 3-phenyl-2-oxazolidinone was obtained from this reaction.

*Example 2.*—A mixture of 97 grams of ethylene carbonate, 119 grams of phenyl isocyanate, and 0.5 gram of anhydrous zinc chloride was placed in a 3-neck flask equipped with thermometer, stirrer, and reflux condenser. The mixture was heated, with stirring, until the temperature reached 235° C. At this point, the mixture was allowed to crystallize, after which it was separated by distilling under 3 mm. pressure. The fraction boiling at 165° C. was identified as 3-phenyl-2-oxazolidinone. It had a melting point of 118° C., and gave a mixed melting point of 118° C. when mixed with 3-phenyl-2-oxazolidinone prepared by a known method. A yield of 65% (based on phenyl isocyanate) of 3-phenyl-2-oxazolidinone was obtained from this reaction.

Among the other isocyanates which I may employ in the process of my invention, to give the corresponding 3-substituted-2-oxazolidinones, are methyl isocyanate, ethyl isocyanate, tolyl isocyanate, and ethyl-phenyl isocyanate.

The 3-substituted-2-oxazolidinones are useful as solvents and plasticizers for cellulose esters and acrylic polymers.

What I claim as my invention and desire to be secured by Letters Patent of the United States is:

1. A process of making 3-phenyl-2-oxazolidinone which comprises heating phenyl isocyanate with ethylene carbonate in the presence of a catalytic amount of sodium carbonate, in the absence of appreciable amounts of moisture, until reaction has taken place.

2. A process of making 3-phenyl-2-oxazolidinone which comprises heating phenyl isocyanate with ethylene carbonate in the presence of a catalytic amount of anhydrous zinc chloride, in the absence of appreciable amounts of moisture, until reaction has taken place.

3. A process of making a 3-substituted-2-oxazolidinone in which the 3-substituent is selected from the group consisting of phenyl, methyl, ethyl, tolyl, and ethyl-phenyl, which comprises heating the corresponding organic isocyanate with ethylene carbonate in the presence of an alkaline agent selected from the group consisting of alkali-forming metal compounds giving a hydroxyl ion and their salts with weak acids, in the absence of appreciable amounts of moisture, until reaction has taken place.

4. A process of making a 3-substituted-2-oxazolidinone in which the 3-substituent is selected from the group consisting of phenyl, methyl, ethyl, tolyl, and ethyl-phenyl, which comprises heating the corresponding organic isocyanate with ethylene carbonate in the presence of an acidic condensation catalyst, in the absence of appreciable amounts of moisture, until reaction has taken place.

5. A process of making 3-phenyl-2-oxazolidinone which comprises heating phenyl isocyanate with ethylene carbonate in the presence of an alkaline agent selected from the group consisting of alkali-forming metal compounds giving a hydroxyl ion and their salts with weak acids, in the absence of appreciable amounts of moisture, until reaction has taken place.

6. A process of making 3-phenyl-2-oxazolidinone which comprises heating phenyl isocyanate with ethylene carbonate in the presence of an acidic condensation catalyst, in the absence of appreciable amounts of moisture, until reaction has taken place.

No references cited.